United States Patent [19]

Kytta

[11] Patent Number: 4,487,022

[45] Date of Patent: Dec. 11, 1984

[54] BRAKE ACTUATOR

[75] Inventor: Oswald O. Kytta, South Bend, Ind.

[73] Assignee: The Bendix Corporation, Southfield, Mich.

[21] Appl. No.: 413,865

[22] Filed: Sep. 1, 1982

[51] Int. Cl.³ .............................................. B60T 13/46
[52] U.S. Cl. ....................................... 60/547.1; 92/169
[58] Field of Search ............................ 60/547.1; 92/169

[56] References Cited

U.S. PATENT DOCUMENTS

| | | | |
|---|---|---|---|
| 2,968,962 | 1/1961 | Randol | 60/547.1 |
| 3,137,361 | 6/1964 | Randol | 92/128 |
| 4,307,570 | 12/1981 | Yardley | 60/547.1 |
| 4,330,996 | 5/1982 | Becht et al. | 91/533 |
| 4,400,942 | 8/1983 | Reinartz et al. | 92/169 |

FOREIGN PATENT DOCUMENTS

| | | |
|---|---|---|
| 0004477 | 10/1979 | European Pat. Off. . |
| 55-24551 | 9/1981 | Japan .................. 92/169 |
| 2018923 | 10/1979 | United Kingdom . |
| 2017852 | 10/1979 | United Kingdom . |
| 2087498A | 5/1982 | United Kingdom . |
| 2087016A | 5/1982 | United Kingdom . |

Primary Examiner—Robert E. Garrett
Assistant Examiner—Scott L. Moritz
Attorney, Agent, or Firm—Leo H. McCormick Jr.; Ken C. Decker

[57] ABSTRACT

A brake actuation assembly (10) wherein a front shell (50) of a booster mechanism (14) is attached to a stationary bulkhead (32) and the housing (58) of a master cylinder (12). On actuation of the booster mechanism (14) an output force is produced to operate the master cylinder (12). The operation of the master cylinder (12) develops a corresponding reaction force which is directly transferred into the stationary bulkhead (22) to substantially eliminate any axial deformation in the rear shell (20) of the booster mechanism (14).

3 Claims, 3 Drawing Figures

Fig. 2

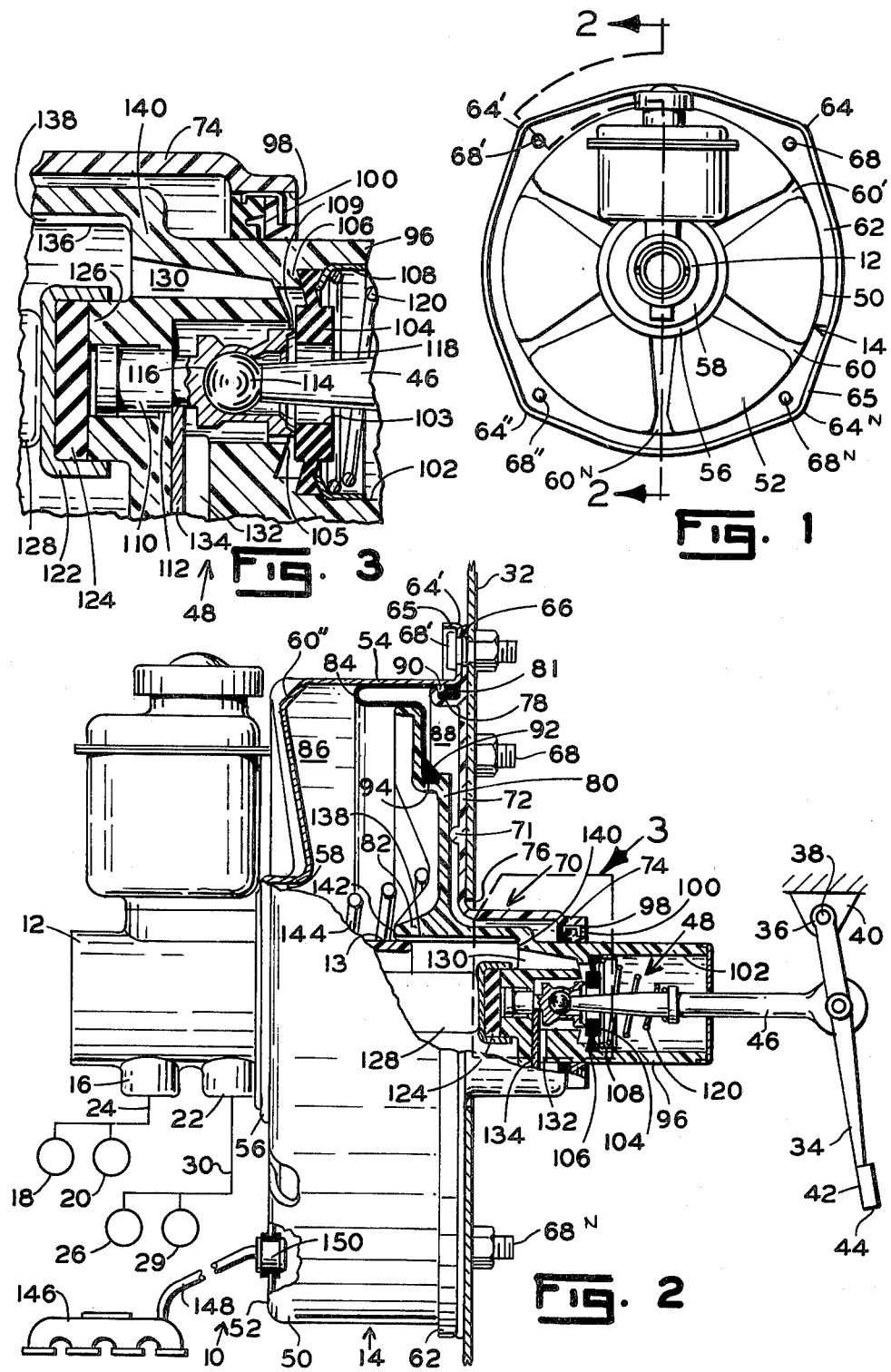

BRAKE ACTUATOR

This invention relates to a brake actuation assembly wherein a reaction force produced in a master cylinder is transferred through a front shell of a brake booster into a stationary bulkhead to substantially eliminate any axial deformation in the rear shell of the brake booster.

In prior art brake actuation assembly it is common practice to attach the rear shell of a brake booster to a stationary bulkhead. When an output force is produced in the brake booster, a reactionary force is produced that is carried through the front and rear shells into the stationary bulkhead. The output force and reactionary force caused the booster to deform axially. Such axial deflection is translated back to the brake pedal as lost motion.

Servo boosters of the type disclosed in U.S. Pat. No. 4,270,353 wherein force transmitting bolts extend through the movable wall of the booster transmitted reactionary force of the master cylinder to the stationary bulkhead substantially correct or eliminate lost motion. While this type of structure eliminated the deformation of the housing of the brake booster under some operational conditions, frictional resistance between the seals on the movable wall and force transmitting bolts can reduce or retard the development of an output force.

In order to avoid the frictional resistance problem associated with the force transmitting bolts, it has been suggested that the master cylinder housing be extended and connected to the stationary bulkhead. U.S. Pat. No. 4,307,570 is typical of what has been called a through structure servo booster assembly. In this type servo booster, the valve structure and/or hub assembly must be sealed to the master cylinder extension. However, the weight of the extension and the valve design have hindered the commercial acceptance of this type of servo booster.

In an effort to utilize substantially commercial components, it has been suggested in U.S. patent application Ser. No. 235,282 that a stirrup arrangement that surrounds the housing of the booster and connected to the master cylinder could be used to reduce axial deformation of the booster. While the stirrup arrangement operates satisfactorily, it does add another component to the brake actuation assembly.

SUMMARY OF THE INVENTION

The brake actuation assembly as disclosed herein has a front shell with a cylindrical body which is attached to a stationary bulkhead and an end plate with pleats therein to which a master cylinder is attached. The pleates provide strength for the end structure to reduce axial deformation in the front shell while the cylindrical body transmits the reactionary force to the bulkhead to eliminate any axial deformation in the rear shell during the development of the output force.

It is therefore an object of this invention to provide a brake actuation assembly with a power assist booster whereby reactionary forces generated in a master cylinder are transmitted through a front shell directly into a fixed bulkhead to substantially eliminate any axial deformation in the rear shell during the development of an output force.

An advantageous effect of this invention is that the rear shell can be made of light weight material such as plastic or aluminum since all the reactionary forces are directly transmitted from the front shell into the fixed bulkhead.

BRIEF DESCRIPTION OF THE DRAWINGS

The invention will now be described with reference to the accompanying drawings wherein:

FIG. 1 is a front end view of the brake actuation assembly;

FIG. 2 is a partial sectional view taken along lines 2—2 of FIG. 1; and

FIG. 3 is a sectional view of the circumscribed area 3 of FIG. 2 showing the control valve for operating the power assist booster.

DETAILED DESCRIPTION OF THE INVENTION

The brake actuation assembly 10 shown in FIGS. 1 and 2 includes a master cylinder 12 and a power assist booster 14.

The master cylinder 12, which is of a type fully disclosed in U.S. Pat. No. 4,249,381 has a first outlet port 16 connected to a first set of wheel brakes 18 and 20 by conduit 24 and a second outlet port 22 connected to a second set of wheel brakes 26 and 29 by conduit 30.

The power assist booster 14 to which the master cylinder 12 is attached is fixed to a stationary bulkhead 32 in a vehicle.

A brake pedal 34 has a first end 36 which pivots on pin 38 fixed to support 40 and a second end 42 with a pad 44. A push rod 46 attached to lever 34 provides control valve 48 with an input signal in response to the application of an input force on pad 44. The input signal operates the control valve 48 to activate the power assist booster 14 and supply master cylinder 12 with a corresponding operational force to effect a brake application. The resistance to movement of the pistons in the master cylinder 12 produces a reactionary force which is carried through the power assist booster 14 into the stationary bulkhead 32. With the power assist booster 14 fixed to the stationary bulkhead 32, any axial movement of the master cylinder 12 is substantially eliminated during the development of the operational force.

In more particular detail, the power assist booster 14 has a front shell 50 joined to a rear shell 70 to form a housing. The front shell 50 has a cylindrical body 54 that extends from an end plate 52. End plate 52 has a lip 56 that mates with and is sealed on shoulder 58 on master cylinder 12. End plate 52 has a series of pleats or crimps 60, 60' . . . $60^N$ that provides structural strength that resists bending. A flange 62 which extends radially outward from the cylindrical body 54 has a series of projections 64, 64' . . . $64^N$ attached thereto and an annular rib 65 that is substantially parallel to the cylindrical body 54. Projections 64, 64' . . . $64^N$ have corresponding openings 66, 66' . . . $66^N$ (only one of which is shown) through which bolts 68 . . . $68^N$ extend to attach the front shell 50 to the stationary bulkhead 32.

Rear shell 70 has a substantially disc shaped end plate 72 which engages the stationary bulkhead and an annular projection 74 that extends through opening 76 in the stationary bulkhead 32. An annular rib 78 with a groove 81 projects from the end plate 72 at a radial location substantially adjacent to the radius of the cylindrical body 54.

A movable wall 80 which extends from hub 82 and diaphragm 84 separates the interior of the housing formed by shells 50 and 70 into a first chamber 86 and a second chamber 88. End 90 of diaphragm 84 which is located in groove 81 engages the interior of cylindrical body 54 to seal the first and second chambers 86 and 88 from the surrounding environment while end 92 snaps into groove 94 on end wall 80 to seal chamber 86 from chamber 88.

Hub 82 has an axial projection 96 that extends through opening 98 in projection 74 on the rear shell 70. A bearing member 100 retained in opening 98 engages the outside surface of axial projection 96 to seal chamber 88 from the surrounding environment.

The axial projection 96 has a stepped bore 102 that retains valve 48. Valve 48, which is of a type fully disclosed in U.S. Pat. No. 4,237,770 is best shown in FIG. 3, has a disc poppet 104 held against a shoulder 106 by a retainer 108 and a plunger 110 that engages bearing surface 112. End 114 of push rod 46 which is retained in socket 116 pivots as pedal 34 rotates on pin 38 to allow plunger 110 to move axially without binding. An annular surface 118 on the end of plunger 110 is urged toward the disc poppet 104 by return spring 120 located between retainer 108 and push rod 46.

A cap member 122 which surrounds rubber reaction disc 124 engages annular rib 126 which engages push rod 128 through which output forces are transmitted to the operational pistons in the master cylinder 12.

Hub 82 has a first passage 130 through which the first chamber 86 is connected to bore 102 and a second passage 132 through which bore 102 is connected to chamber 88. A key 134 located in passage 132 engages plunger 110 to hold valve 48 in bore 102.

The size of bore 102 is such that surface 136 engages the extension 13 of the master cylinder 12. To assure that fluid communication is present between chamber 86 and passage 130, axial grooves 138 (only one is shown) are located between shoulder 140 and end 142 of hub 82.

A return spring 144 located between shoulder 58 and wall 80 urges the hub 82 toward chamber 88 as shown in FIG. 2.

MODE OF OPERATION OF THE INVENTION

When an internal combustion engine is in operation, vacuum is created at the intake manifold 146. Conduit 148 attached to check valve 150 connects chamber 86 to the intake manifold 146.

With vacuum in chamber 86, air is drawn from chamber 88 through passage 132, bore 102, and passage 130 until the fluid pressure in chambers 86 and 88 are equal. With the fluid pressure in chambers 86 and 88 equal, return spring 144 holds the hub 82 against stop 71.

When an operator desires to effect a brake application, an input force is applied to pad 44 of pedal 34. This input force causes pedal 34 to pivot about pin 38 and impact a linear force to push rod 46. Initial movement of push rod 46 allows poppet disc 104 to engage seat 105 and terminate vacuum communication through passage 130. Further movement of push rod 46, moves annular face 109 away from the poppet disc 104 to allow air present in bore 102 to flow past opening 103 to passage 132 and into chamber 88. With air in chamber 88 and vacuum in chamber 86, a pressure differential is created across wall 80. This pressure differential acts on wall 80 to develop an operational output force that is transmitted from the hub 82 to push rod 128 by way of reaction disc 124. Push rod 128 moves the pistons in the master cylinder 12 to pressurize fluid which is supplied by conduits 24 and 30 to effect an application of brakes 18, 20, 26 and 29.

The resistance to movement of the pistons in master cylinder 12 by the output force produces a corresponding reactionary force. This reactionary force is transmitted from the master cylinder 12 through shoulder 58 into end plate or wall 52. Since end plate 52 is rigidly connected to cylindrical body 54, the reactionary force is directly transmitted into stationary bulkhead 32 by way of bolts 68 ... $68^N$ and flange 62 ... $62^N$. Pleats or crimps 60 ... $60^N$ provide rigidity for end plate 52 thus, axial deformation is substantially eliminated in the front sheel 50 and totally eliminated for the rear shell 70 which does not receive any of the reactionary forces. With axial deformation substantially all the linear movement of push rod 46 in response to the input applied to pedal 34 is translated into the development of the output force.

On termination of the input force on pedal 34, return spring 120 moves annular face 109 against disc poppet 104 to interrupt communication of air into chamber 88. Further movement of push rod 46 by spring 120 moves disc poppet 104 away from seat 105 to allow vacuum to evacuate air from chamber 88 into chamber 86 for eventually communication to manifold 146. As air is removed from chamber 88, the pressure differential across wall 80 is eliminated and return spring 144 moves hub 82 to the rest position against stop 71 as shown in FIG. 2.

It is envisioned that the front shell 50, because of the stiffener ribs pleats or crimps 60 ... $60^N$, could be made from a lightweight metal such as aluminum and resist any axial deformation that could result during the development of the output force. In addition, the rear shell 70 could be made of a plastic material similar to the material in hub 82 since it is not required to resist tensional stresses.

I claim:

1. A brake actuation assembly comprising:
   a master cylinder having a cylindrical body with a shoulder located between a first end and a second end and a bore therein, piston means located in said bore;
   a power assist booster having a front shell joined to a rear shell to define a housing, said front shell having an end plate fixed to said shoulder and a cylindrical body attached to said end plate, said cylindrical body having a flange that extends radially outward, said flange having a series of openings therein, said rear shell having a disc with a projection that extends through a first opening in a stationary bulkhead, said disc having a rib adjacent its periphery, said rib having a groove therein, said projection having a second opening therein, a movable wall for separating a first chamber from a second chamber in said housing, said movable wall having a hub member and a diaphragm member, said hub member having an annular projection that extends through said second opening and engages said projection on said rear shell, said hub having a bore therein, said first end of said cylindrical body of said master cylinder extending into said bore and engaging said hub, said hub having a series of grooves through which said first chamber is continually connected to said bore, said diaphragm member having a first bead located in said groove in said rib and a second bead attached to said hub, said first bead engaging said cylindrical body to seal said first and second chambers from the surrounding engagement and for resiliently positioning said cylindrical body in an axial plane with said pistons in said master cylinder, and a valve for controlling flow communication of fluid through said bore between said first and second chambers;

fastener means extending through said opening in said flange to connect said front shell to said stationary bulkhead;

an actuator responsive to an input signal for operating said valve to control the development of a pressure differential between said first and second chambers by interrupting fluid communication to said first chamber and initiating fluid communication to said second chamber with the surrounding environment, said pressure differential acting on and moving said wall to produce an output force, the engagement of said cylindrical body and projection on said rear shell holding said hub in said axial plane within said booster to allow said output force to move said piston means in said master cylinder without the development of any lateral forces, said piston means responding to said output force by developing a reaction force, said reaction force being transferred from said master cylinder through said front shell into said stationary bulkhead to substantially eliminate the creation of any axial deformation of said rear shell.

2. The brake actuation assembly as recited in claim 1 wherein said end plate of said front shell has a series of radial pleats to provide structural rigidity and thereby reduce the development of axial deformation of the front shell during the development of said output force.

3. The brake actuation assembly as recited in claim 2 wherein said flange is characterized by an annular rib that provides additional structural stability to resist axial deformation during the development of the output force.

* * * * *